United States Patent Office 3,454,606
Patented July 8, 1969

3,454,606
ISOCYANATOPHENYLSULFONYL
ISOCYANATES
Thomas K. Brotherton, John W. Lynn, and John Smith, Jr., Charleston, W. Va., assignors to Union Carbide Corporation, a corporation of New York
No Drawing. Continuation-in-part of application Ser. No. 220,065, Aug. 28, 1962. This application Nov. 14, 1963, Ser. No. 323,552
Int. Cl. C07c 143/80, 119/04
U.S. Cl. 260—397.7                                    2 Claims This application is a continuation-in-part of an application entitled, "Isocyanato-sulfonyl Isocyanates and Process For Preparation," Ser. No. 220,065, filed Aug. 28, 1962, by T. K. Brotherton, J. W. Lynn and J. Smith, Jr., now abandoned.

This invention relates to novel isocyanates, various derivatives thereof, and to a process for their preparation. In one aspect, this invention relates to novel isocyanato-sulfonyl isocyanates having at least one sulfonyl isocyanate group and at least one isocyanate group per molecule.

The isocyanato-sulfonyl isocyanates of this invention can be conveniently represented by the following formula:

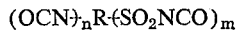

$$(OCN)_nR(SO_2NCO)_m$$

wherein R represents a substituted or unsubstituted polyvalent aliphatic, alicyclic or aromatic group and $n$ and $m$ are whole positive integers of 1 or greater. Preferred compounds are those wherein R represents a polyvalent hydrocarbon group containing from 1 to 24 carbon atoms and $n$ and $m$ have a total value of from 2 to 8, more particularly from 2 to 4.

Illustrative isocyanate compounds encompassed by the present invention include, among others, 4-isocyanatobutane-sulfonyl isocyanate,
5-isocyanatopentanesulfonyl isocyanate,
4-isocyanatobenzenesulfonyl isocyanate,
4-isocyanatobenzene-disulfonyl isocyanate,
2,5-diisocyanatobenzenesulfonyl isocyanate,
4-isocyanatonaphthalenesulfonyl isocyanate,
4-isocyanatocyclohexanesulfonyl isocyanate,
4-isocyanatooctane-sulfonyl isocyanate, and the like and various derivatives thereof as hereinafter described.

The term "substituted" as used throughout the specification and appended claims is meant to further define the novel compositions of matter to include those wherein the aforementioned R group can be aliphatic with acyclic or aromatic substituents; alicyclic with aliphatic or aromatic substituents; or aromatic with aliphatic or alicyclic substituents in addition to other groups hereinafter indicated.

The sulfonyl isocyanates of this invention are very reactive materials which condense readily with active hydrogen-containing compounds such as alcohols, amines, carboxylic acids, amides, and water to form the corresponding carbamates, ureas, and the like. Additionally, the sulfonyl isocyanates can be homopolymerized to yield dimeric, trimeric and polymeric substances, or copolymerized to form valuable polymeric products. Isocyanate-containing copolymers have been found particularly useful in the preparation of urethane foams, fibers, films, coatings, elastomers, and castings. For example, the polyisocyanates are useful in the preparation of flexible, high molecular weight polymers by incorporating the polyisocyanate with flexible resins such as polyether glycols.

Inasmuch as the isocyanate compositions of this invention are polyfunctional, in that each compound contains at least one isocyanate group and at least one sulfonyl isocyanate group in the molecule they are particularly useful in those fields of application wherein polyisocyanates have been utilized. Furthermore, the sulfonyl isocyanates of this invention possess many desirable properties not usually found in reactive isocyanates. For example, the sulfonyl isocyanates are of the order of 150,000 times more reactive with alcohols than highly reactive aromatic isocyanates. Thus, polyurethane foams can be prepared, for example, from 4-isocyanatobenzenesulfonyl isocyanate in the absence of a catalyst, whereas, a catalyst and highly purified reagents are required when commercially available aromatic isocyanates are employed. Moreover, the novel compositions, such as 4-isocyanatobenzenesulfonyl isocyanate, exhibit none of the undesirable lachrymatory properties inherent in many commercial isocyanates.

It is therefore an object of the present invention to provide novel isocyanato-sulfonyl isocyanates and novel derivatives thereof which are suitable for use in the plastic and resin field. Another object is to provide new compositions of matter comprising the isocyanato-sulfonyl isocyanates. Another object of this invention is to provide novel compositions containing at least two isocyanate groups. A still further object of the present invention is to provide novel compounds having polyfunctional properties. Another object of the present invention is to provide a novel process for the preparation of the aforesaid compositions. These and other objects will readily become apparent to those skilled in the art in the light of the teachings herein set forth.

In one aspect, this invention is directed to novel isocyanato-sulfonyl isocyanates of the aforementioned general formula and to a process for their preparation. These novel compositions are multifunctional in nature in that each compound is characterized by the presence of at least two isocyanate groups which are available for reaction.

The following compounds illustrate the sulfonyl isocyanates which can be prepared by the process of the present invention: the isocyanatoalkanesulfonyl isocyanates, e.g., 2-isocyanatoethanesulfonyl isocyanate,
3-isocyanatopropanesulfonyl isocyanate,
4-isocyanatobutanesulfonyl isocyanate,
7-isocyanatoheptanesulfonyl isocyanate,
8-isocyanatooctanesulfonyl isocyanate,
9-isocyanatononanesulfonyl isocyanate,
10-isocyanatodecanesulfonyl isocyanate,
2-methyl-3-isocyanatopropanesulfonyl isocyanate,
2,2-dimethyl-3-isocyanatopropanesulfonyl isocyanate,
3,4-diethyl-5-isocyanatopentanesulfonyl isocyanate,
4,4-dimethyl-6-isocyanatohexanesulfonyl isocyanate,
2-methyl-4-ethyl-6-isocyanatohexanesulfonyl isocyanate,
5,6,7-triethyl-9-isocyanatononanesulfonyl isocyanate,
and the like; the isocyanatoalkenesulfonyl isocyanates, e.g., 4-isocyanato-2-butenesulfonyl isocyanate,
5-isocyanato-3-pentenesulfonyl isocyanate,
7-isocyanato-4-heptenesulfonyl isocyanate,
8-isocyanato-4-octenesulfonyl isocyanate,
9-isocyanato-5-nonenesulfonyl isocyanate,
10-isocyanato-6-decenesulfonylisocyanate,
3-ethyl-5-isocyanato-3-pentenesulfonyl isocyanate,
3,4-dimethyl-5-isocyanato-3-pentenesulfonyl isocyanate,
2-methyl-4-ethyl-6-isocyanato-2-hexenesulfonyl isocyanate,
5,6,7-triethyl-9-isocyanato-4-nonenesulfonyl isocyanate, and the like; the isocyanatoalkynesulfonyl isocyanates, e.g., 5-isocyanato-2-butynesulfonyl isocyanate,
7-isocyanato-4-heptynesulfonyl isocyanate,
10-isocyanato-4-decynesulfonyl isocyanate,
9-isocyanato-5-nonynesulfonyl isocyanate, and the like;
the substituted isocyanatoalkanesulfonyl isocyanates, e.g.,
2-phenyl-3-isocyanatopropanesulfonyl isocyanate,
3-naphthyl-5-isocyanatopentanesulfonyl isocyanate,
3-styryl-5-isocyanatopentanesulfonyl isocyanate,
4-tolyl-6-isocyanatohexanesulfonyl isocyanate,
6-cumenyl-7-isocyanatoheptanesulfonyl isocyanate,
5-xylyl-8-isocyanatooctanesulfonyl isocyanate,
7-mesityl-9-isocyanatononanesulfonyl isocyanate,
2-cyclohexyl-3-isocyanatopropanesulfonyl isocyanate,
3-cyclohexyl-5-isocyanatopentanesulfonyl isocyanate,
4-cyclohexyl-6-isocyanatohexanesulfonyl isocyanate,
5-cyclohexylmethyl-7-isocyanatoheptanesulfonyl isocyanate,
5-cycloheptenylmethyl-8-isocyanatooctanesulfonyl isocyanate, and the like. The isocyanatocycloalkanesulfonyl isocyanates, e.g.

2-isocyanatocyclobutanesulfonyl isocyanate,
3-isocyanatocyclopentanesulfonyl isocyanate,
4-isocyanatocyclohexanesulfonyl isocyanate,
5-isocyanatocycloheptanesulfonyl isocyanate,
6-isocyanatocyclooctanesulfonyl isocyanate,
7-isocyanatocyclonanesulfonyl isocyanate, and the like;
the isocyanatocycloalkenesulfonyl isocyanates, e.g.,
3-isocyanato-4-cyclopentenesulfonyl isocyanate,
4-isocyanato-5-cycloheptenesulfonyl isocyanate,
5-isocyanato-6-cycloheptenesulfonyl isocyanate,
6-isocyanato-7-cyclooctenesulfonyl isocyanate, and the like; the substituted isocyanatocycloalkanesulfonyl isocyanates, e.g.,
2-isocyanatocyclobutylmethanesulfonyl isocyanate,
2-isocyanato-2-ethylcyclobutanesulfonyl isocyanate,
3-isocyanatocyclopentylmethanesulfonyl isocyanate,
3-isocyanato-2-ethylcyclopentanesulfonyl isocyanate,
5-isocyanatocycloheptylmethanesulfonyl isocyanate,
3-isocyanato-5-methylcyclohexanesulfonyl isocyanate,
3-isocyanato-5,6-dimethylcyclohexanesulfonyl isocyanate,
3-isocyanato-4-ethylcyclopentanesulfonyl isocyanate,
3-isocyanato-4,5-diethylcyclopentanesulfonyl isocyanate,
and the like; the substituted isocyanatocycloalkenesulfonyl isocyanates, e.g.,
4-isocyanato-5-methyl-2-cyclohexenesulfonyl isocyanate,
and the like.

The isocyanatoarylsulfonyl isocyanates, e.g.,
2-isocyanatobenzenesulfonyl isocyanate,
3-isocyanatobenzenesulfonyl isocyanate,
4-isocyanatobenzenesulfonyl isocyanate,
7-isocyanato-2-naphthalenesulfonyl isocyanate,
7-isocyanato-1-naphthalenesulfonyl isocyanate,
4'-isocyanato-4-biphenylsulfonyl isacyanate,
5-isocyanato-2-indenesulfonyl isocyanate,
4-isocyanatophenylethanesulfonyl isocyanate,
4-(3'-isocyanatopropyl)benzenesulfonyl isocyanate,
2-(3'-isocyanatopropyl)naphthalenesulfonyl isocyanate,
4-isocyanato-2-propylbenzenesulfonyl isocyanate,
4-isocyanatomethylbenzenesulfonyl isocyanate,
4-isocyanatomethyl-α-toluenesulfonyl isocyanate, and the like, Although the preferred isocyanato-sulfonyl isocyanates of this invention contain no elements other than carbon, hydrogen, oxygen, nitrogen and sulfur, the molecule can be substituted with or linked by various organic and inorganic radicals containing such groups as ether, sulfide, polysulfide, sulfoxide, sulfone, sulfonate, ester, ketone, carboxylic acid ester, nitro, nitrile, nitroso, carbonate, silane, halogen, e.g., chloro, and various metal groups.

In accordance with the instant invention, the isocyanatosulfonyl isocyanates can be produced in relatively high yields by the reaction of the corresponding amino-sulfonamide starting material, contained in an inert, normally liquid reaction medium with a carbonyl dihalide and thereafter recovering the sulfonyl isocyanate product. The process for the preparation of the novel compositions of this invention is, in general, simpler than that employed for conversion of alkyl and aryl amines to the corresponding isocyanates. Several hours conversion time are generally necessary in the latter instance. Additionally, troublesome residues frequently are formed with the known amines. Thus the resulting isocyanates must be carefully distilled to obtain adequate purity. In contrast, the aminosulfoamides, e.g., sulfanilamide, are conveniently subjected to phosgenation in nitrobenzene solvent at about 150° C. for as little as 2 or 3 hours. Thereafter, the solvent is removed by flash distillation followed by flash distillation of the product itself to give an isocyanatosulfonyl isocyanate of a high degree of purity. In most instances further refinement of the product is not required.

The starting materials for the production of the novel isocyanate compositions of the present invention, as hereinbefore indicated, are the corresponding amino-sulfonamides. These compositions can be conveniently represented by the following general formula:

$$(NH_2)_n R (SO_2NH_2)_m$$

wherein R, n and m have the same value as previously indicated.

Suitable starting materials include the following aminosulfonamides:
2-aminoethanesulfonamide,
2-aminopropanesulfonamide,
4-aminobutanesulfonamide,
7-aminoheptanesulfonamide,
8-aminooctanesulfonamide,
9-aminononanesulfonamide,
10-aminodecanesulfonamide,
2-methyl-3-aminopropanesulfonamide,
2,2-dimethyl-3-aminopropanesulfonamide,
3,4-diethyl-5-aminopentasulfonamide,
4,4-dimethyl-6-aminohexanesulfonamide,
2-methyl-4-ethyl-6-aminohexanesulfonamide,
5,6,7-triethyl-9-aminononanesulfonamide,
4-amino-2-butenesulfonamide,
5-amino-3-pentenesulfonamide,
7-amino-4-heptenesulfonamide,
8-amino-4-octenesulfonamide,
9-amino-5-nonenesulfonamide,
10-amino-4-decenesulfonamide,
3-ethyl-5-amino-3-pentenesulfonamide,
3,4-dimethyl-5-amino-3-pentenesulfonamide,
2-methyl-4-methyl-6-amino-2-hexenesulfonamide,
5,6,7-triethyl-9-amino-4-nonenesulfonamide,
5-amino-2-butynesulfonamide,
7-amino-4-heptynesulfonamide,
10-amino-4-decynesulfonamide,
9-amino-5-nonynesulfonamide,
2-phenyl-3-aminopropanesulfonamide,
3-naphthyl-5-aminopentanesulfonamide,
3-styryl-5-aminopentanesulfonamide,
4-tolyl-6-aminohexanesulfonamide,
6-cumenyl-7-aminoheptanesulfonamide,
5-xylyl-8-aminooctanesulfonamide,
7-mesityl-9-aminononanesulfonamide,
2-cyclohexyl-3-aminopropanesulfonamide, 3-cyclohexyl-5-aminopentanesulfonamide,
4-cyclohexyl-6-aminohexanesulfonamide,
5-cyclohexylmethyl-7-aminoheptanesulfonamide,
5 - cycloheptenylmethyl-8-aminooctanesulfonamide, and the like.
2-aminocyclobutanesulfonamide,
3-aminocyclopentanesulfonamide,
4-aminocyclohexanesulfonamide,
5-aminocycloheptanesulfonamide,
6-aminocyclooctanesulfonamide,
7-aminocyclononanesulfonamide,
3-aminocyclopent-4-enesulfonamide,
4-aminocyclohept-6-enesulfonamide,
5-aminocyclohept-6-enesulfonamide,
6-aminocyclooct-7-ene-sulfonamide,
2-aminocyclobutylmethanesulfonamide,
2-amino-2-ethylcyclobutanesulfonamide,
3-aminocyclopentylmethanesulfonamide,
3-amino-2-ethylcyclopentanesulfonamide,
5-aminocycloheptylmethanesulfonamide,
3-amino-5-methylcyclohexanesulfonamide,
3-amino-5,6-dimethylcyclohexanesulfonamide,
3-amino-4-ethylcyclopentanesulfonamide,
3-amino-4,5-diethylcyclopentanesulfonamide,
4-amino-5-methylcyclohex-2-enesulfonamide, and the like.
2-aminobenzenesulfonamide,
3-aminobenzenesulfonamide,
4-aminobenzenesulfonamide,
7-amino-2-naphthalenesulfonamide,
7-amino-1-naphthalenesulfonamide,
4'-amino-4-biphenylsulfonamide,
5-amino-2-indenesulfonamide,
4-aminophenylethanesulfonamide,
4-(3'-aminopropyl)benzenesulfonamide,
2-(3'-aminopropyl)naphthalenesulfonamide,
4-amino-2-propylbenzenesulfonamide,
4-aminoethylbenzenesulfonamide,
4-aminomethyl-α-toluenesulfonamide, and the like.

The amino-sulfonamides are themselves prepared by several economically attractive routes from relatively inexpensive raw materials. For instance, the aminoalkanesulfonamides are prepared by the reaction of the appropriate chloroalkanesulfonyl chloride with ammonia. The aromatic sulfonamides are prepared by the reaction of an aromatic sulfonyl chloride with ammonia. Sulfochlorination of the alkanes and chlorosulfonation of aromatic compounds can be effected, for example, with sulfuryl chloride or chlorosulfonic acid respectively.

In general the conversion of the amino-sulfonamide to the isocyanato-sulfonyl isocyanate is accomplished by sparging a carbonyl dihalide, more preferably phosgene, through a solution or slurry of the sulfonamide contained in an inert, normally liquid reaction medium at a temperature within the range of from about 100° to about 250° C., more preferably from about 125° to about 170° C., and thereafter recovering the sulfonyl isocyanate product.

In general, the liquid reaction medium employed for the conversion of the sulfonamide to the corresponding sulfonyl isocyanate must be inert to the reactants and stable under the conditions employed. Moreover, it should be easily separable from the resulting product. Typical inert, liquid solvents which have been found suitable for utilization as media in the process of the present invention include, among others, aromatic hydrocarbons such as toluene, xylene, naphthalene, tetrahydronaphthalene, benzene, diphenyl, cymene, amylbenzene, cycloaliphatic hydrocarbons such as cyclohexane, heptylcyclopentane, decahydronaphthalene; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the nitrated aromatic hydrocarbons such as nitrobenzene; the dialkyl ketones such as diisobutyl ketone, methylisobutyl ketone, methylhexyl ketone, diisopropyl ketone and other solvents such as tetramethylene sulfone, and the like.

Although reaction temperatures within the aforementioned range of from about 100° to about 250° C., have been found desirable, temperatures above and below this range can also be employed. However, from economic consideration the optimum yield and rate of reaction are attained within the aforesaid range. The particular temperature employed will be dependent, in part, upon the amino-sulfonamide starting material.

Pressure is in no wise critical and the instant process can be conducted at atmospheric, subatmospheric and superatmospheric pressures.

Although the process of the instant invention preferably is conducted with phosgene, in its broadest concept the process includes the utilization of any carbonyl dihalide such as carbonyl difluoride or carbonyl dibromide. However, for economic considerations phosgene is the preferred carbonyl dihalide. In the preparation of the novel sulfonyl isocyanates of this invention, phosgene can be used in either the gaseous or liquid form.

Inasmuch as the yield and rate of formation of the sulfonyl isocyanates are dependent upon several variables, for example, concentration of the sulfonamide, solubility of the sulfonamide and phosgene in the reaction medium, reaction temperature, pressure and rate of addition of the phosgene, no hard and fast rule can be devised regarding the optimum conditions to be employed.

In the preferred embodiment of the process of this invention, the sulfonamide was slurried in nitrobenzene. Thereafter, gaseous phosgene was sparged through the reaction mixture at a temperature within the aforesaid range and for a period of time to essentially complete the reaction. After removal of the by-product hydrogen chloride and nitrobenzene solvent, the product was recovered by flash distillation.

In practice, it has been found that the mole ratio of phosgene to amino-sulfonamide in the initial reaction medium preferably should be in excess of 3:1, although satisfactory results have been obtained at a lower ratio. When the phosgene subsequently is sparged into the reaction medium feed rates of up to about 10 miles of phosgene per mole of sulfonamide per hour are preferred, although higher rates can equally as well be employed.

In another aspect, this invention is directed to certain novel derivatives of the aforementioned novel isocyanates. One embodiment of this invention encompasses the isocyanato-sulfonamides of the formula:

$(OCN)_nR(SO_2-NH_2)_m$

Wherein R, $n$ and $m$ have the same value as previously indicated. Particularly preferred compositions are those wherein $n$ and $m$ are 1 and R represents a divalent, aromatic hydrocargon group containing from 6 to 12 carbon atoms. These compositions can be conveniently prepared by either of two methods. For example, while phosgenation of p-aminobenzenesulfonamide in an inert medium at 150° C. gives p-isocyanatobenzenesulfonyl isocyanate, at 90° C. and otherwise identical conditions the p-isocyanato-benzenesulfonamide is obtained. Alternatively, the isocyanatosulfonyl isocyanates, for example, p-isocyanatobenzenesulfonyl isocyanate, upon reaction with equimoles of water gives the white, crystalline, solid p-isocyanatobenzenesulfonamide.

Other illustrative derivatives encompassed by the above formula include, the isocyanatoalkanesulfonamides, e.g. 2-isocyanatoethanesulfonamide, 8-isocyanatoctanesulfonamide, 3,4-diethyl-5-isocyanatopentanesulfonamide, and the like; the isocyanatoalkenesulfonamides, e.g., 8-isocyanato-4-octenesulfonamide, 9-isocyanato-5-nonenesulfonamide, 10-isocyanato-6-decenesulfonamide, and the like; the isocyanatocycloalkenesulfonamides, e.g., 4-isocyanatocyclohexanesulfonamide, 6 - isocyanatocyclooctanesulfonamide, and the like; the isocyanatocycloalkenesulfonamides, e.g. 4-isocyanato-5-cycloheptenesulfonamide, 4-isocyanato-3-cyclohexenesulfonamide, and the like, the isocyanatoarylsulfonamides, e.g., m-isocyanatobenzenesulfonamide, 7-isocyanato-2-naphthalenesulfonamide, 7-isocyanato-1-naphthalenesulfonamide, 4'-isocyanato-4-biphenylsulfonamide, and the like.

A second embodiment of this invention encompasses derivatives obtained by the reaction of the novel isocyanatosulfonyl isocyanates with active hydrogen-containing compounds under such conditions, as hereinafter described, that only the sulfonyl isocyanate group reacts. These derivatives can be represented by the following formula:

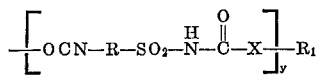

wherein R has the same value as previously indicated; $R_1$ represents a monovalent or polyvalent group, preferably an aliphatic hydrocarbon group of from 1 to 24 carbon atoms; X represents the group

—O—, or —S—, wherein $R_2$ is hydrogen or a hydrocarbon group of from 2 to 12 carbon atoms; and $y$ has a value of from 1 to 8, preferably from 1 to 2.

Illustrative derivatives encompassed by the aforesaid formula include, among others, the isocyanatoalkanesulfonylcarbamate, e.g., methyl 2-isocyanatoethanesulfonylcarbamate, propyl 10-isocyanatodecanesulfonylcarbamate, allyl 3-isocyanatopropanesulfonylcarbamate, cyclohexyl 5-isocyanatopentanesulfonylcarbamate, phenyl 8-isocyanatooctanesulfonylcarbamate, and the like; the isocyanatocycloalkane sulfonylcarbamates, e.g., ethyl 4-isocyanatocyclohexanesulfonylcarbamate, propyl 4-isocyanatocyclohexanesulfonylcarbamate, cyclohexyl 4-isocyanatocyclohexanesulfonylcarbamate, phenyl 4-isocyanatocyclohexanesulfonylcarbamate, and the like; the isocyanatoarylsulfonylcarbamates, e.g., methyl 4-isocyanatobenzenesulfonylcarbamate, butyl 1-isocyanatonaphthalenesulfonylcarbamate, cyclohexyl 4-isocyanatobenzenesulfonylcarbamate, phenyl 4-isocyanatobenzenesulfonylcarbamate, and the like.

The isocyanatoalkanesulfonylthiocarbamates, e.g., methyl 2-isocyanatoethanesulfonylthiocarbamate, cyclohexyl 5-isocyanatopentanesulfonylthiocarbamate and the like; the isocyanatocycloalkanesulfonylthiocarbamates, e.g., methyl 4-isocyanatocyclohexanesulfonylthiocarbamate, phenyl 4-isocyanatocyclohexanesulfonylthiocarbamate, and the like; the isocyanatoarylsulfonylthiocarbamates, e.g., methyl 4-isocyanatobenzenesulfonylthiocarbamate, phenyl 4-isocyanatobenzenesulfonylthiocarbamate, and the like.

The isocyanatoalkanesulfonyl ureas, e.g., 1-methyl 3(2-isocyanatoethanesulfonyl) urea, 1-phenyl 3(5-isocyanatopentanesulfonyl) urea, 1-cyclohexyl 3(7-isocyanatoheptanesulfonyl) urea, and the like; the isocyanatocycloalkanesulfonyl ureas, e.g., 1-ethyl 3(4-isocyanatocyclohexanesulfonyl) urea, and the like; the isocyanatoarylsulfonyl ureas, e.g., 1-methyl 3(4-isocyanatobenzenesulfonyl) urea, and the like.

Also included in this embodiment are the derivatives encompassed by the aforesaid formula wherein $y$ is greater than 1, that is, those compositions prepared from the reaction of two or more moles of the sulfonyl isocyanates with one mole of a compound containing more than one active hydrogen. For example, the reactin product obtained from 4-isocyanatobenzenesulfonyl isocyanate and a polyfunctional alcohol, amine or mercaptan, e.g., ethylene glycol, ethylene diamine, ethylene dithiol, and the like. Depending upon the choice of active hydrogen-containing compound, the resulting composition may contain two, three, four or more isocyanate groups. For instance, the reaction product obtained from 4-isocyanatobenzenesulfonyl isocyanate and pentaerythritol will have four pendant isocyanate groups. Relatively high molecular weight linear diisocyanates can also be prepared by reacting the aforementioned isocyanate sulfonyl isocyanates with polyalkylene glycols, e.g., polyethylene glycol, of molecular weights of up to 6000 and higher. Additionally, the polyfunctional compound need not possess the same active hydrogen-containing group in the molecule. For example, ethanolamine, ethanolmercaptan, and the like, can be employed to give a diisocyanate compound wherein X of the aforesaid formula is different in the same molecule.

Each of the aforesaid derivatives of this embodiment of the instant invention are conveniently prepared by the gradual addition of the active hydrogen-containing compound to the sulfonyl isocyanate contained in a suitable solvent, e.g., benzene. Inasmuch as the sulfonyl isocyanate group is more reactive than the isocyanate group in the same molecule, the former group reacts preferentially with the active hydrogen-containing compound. For example, when methanol was slowly fed to a benzene solution of p-isocyanatobenzenesulfonyl isocyanate, and the mixture stirred at 30° C., the methyl p-isocyanatophenylsulfonylcarbamate was recovered in quantitative yield.

The novel derivatives of this embodiment, particularly those wherein $y$, of the above formula, is greater than 1, are useful in those fields of application wherein polyisocyanates are utilized, for example, foams, castings, and the like.

In a third embodiment, this invention also encompasses novel derivatives of the following formula:

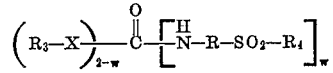

wherein R has the same value as previously indicated; $R_3$ represents a hydrocarbon group, preferably of from 1 to 24 carbon atoms; X represents the groups

—O—, or —S—, wherein $R_2$ is hydrogen or a hydrocarbon group of from 2 to 12 carbon atoms; $R_4$ represents the groups —$NH_2$ or

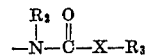

and $w$ has a value of from 1 to 2.

The compositions of this embodiment include those obtained by the reaction of the aforementioned isocyanatosulfonamide derivatives with an additional mole of water to form the bis(ureylene) compounds, $w$ of the above formula being 2. For example, as indicated in Examples III and IV, when p-isocyanatobenzenesulfonyl isocyanate was reacted with one mole of water the p-isocyanatobenzenesulfonamide was obtained. Further reaction with an additional equimolar amount of water gave 4,4'-ureylene bis(benzenesulfonamide) in 65 percent yield. In a similar manner the ureylene bis(carbamate) derivatives can be obtained from the p-isocyanatophenyl carbamate and an equimolar amount of water. For instance dimethyl 4,4'-ureylene bis(phenylsulfonyl carbamate) was conveniently obtained from methyl p-isocyanatophenyl sulfonylcarbamate as indicated in Example VI.

Included within this embodiment are the derivatives obtained when all the isocyanato groups of the sulfonyl isocyanates react with an active hydrogen-containing compound. For example, the reaction of allyl alcohol with p-isocyanatobenzenesulfonyl isocyanate gave N-(allyloxycarbonyl)-4-allyl-oxyformamidobenzenesulfonamide in 96 percent yield. Similarly, when allylamine or n-butylamine were employed N-(allylcarbamoyl)-4-allylureylenebenzenesulfonamide and N-(n-butylcarbamoyl)-4-(n-butylureylene)benzenesulfonamide were obtained.

In general, the derivatives of this embodiment are obtained by the gradual addition of the isocyanatosulfonyl compound to the active hydrogen-containing compound contained in a suitable solvent, such as benzene. Thereafter, the mixture can be heated to about 60° C., or higher, and the derivative recovered by conventional techniques, such as filtration, and the like.

As indicated in the previous embodiments, the active hydrogen-containing compounds suitable for use in the preparation of the compositions of this invention, include alcohols, amines, mercaptans and the like. These compositions can be saturated or unsaturated; aliphatic cycloaliphatic or aromatic and contain preferably from 1 to 24 carbon atoms. Illustrative active hydrogen-containing compounds include, among others, methanol, ethanol, propanol, decanol, pentadecanol, allyl alcohol, cyclohexanol, phenol, ethylamine, butylamine, hexylamine, octadecylamine, cyclohexylamine, aniline, ethanethiol, butanethiol, cyclohexanethiol, benzenethiol, 2-naphthalenethiol, and the like.

In a further embodiment, this invention encompasses derivatives of the aforesaid novel sulfonyl isocyanates wherein at least one isocyanate group and one sulfonyl isocyanate group in the same molecule are reacted with polyfunctional active hydrogen-containing compounds to give polymeric compositions characterized by the recurring unit:

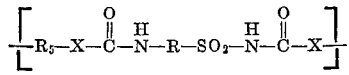

wherein R and X have the same value as previously indicated and $R_5$ represents the residue of the polyfunctional active hydrogen-containing compound. Preferably $R_5$ is a linear aliphatic group composed of carbon, hydrogen and oxygen.

Depending upon the choice of polyfunctional active hydrogen-containing compound, these polymeric compositions range from viscous liquids to hard, tough solids having a variety of uses in such fields as castings, fibers, films, elastomers and the like.

Illustrative polyfunctional active hydrogen-containing compounds which can be employed with the isocyanatosulfonyl isocyanates of this invention include the polyalkylene glycols having molecular weights of up to 3000 and higher, e.g., polyethylene glycol having a molecular weight of 400, polypropylene glycol having a molecular weight of 2025, and the like; the alkylene oxide adducts of diols, triols and the like, e.g., the propylene oxide adduct to sorbitol to a hydroxyl number of 509, the propylene oxide adduct to hexanetriol to a hydroxyl number of 240, and the like.

The polymeric compositions of this embodiment are conveniently prepared by mixing the sulfonyl isocyanate and reactive hydrogen-containing compound and heating for a period of time and at a temperature sufficient to form a polymeric product. In general, the mixture is initially heated to a temperature of about 75° C. for four hours and then at 100° C. or higher for a period of sixteen hours or longer. The actual curing temperature employed may of course vary somewhat with the particular components employed.

In practice, the components of the mixture are employed in such quantities that the ratio of active hydrogens to isocyanate groups is from about 1 to 1. Amounts above and below this ratio can be employed but are less preferred.

The following examples are illustrative.

EXAMPLE I p-Isocyanatobenzenesulfonyl isocyanate

A slurry of sulfanilamide (172 grams, 1.0 mole) in nitrobenzene (1000 grams) was added to a nitrobenzene (548 grams) solution of phosgene (396 grams, 4 moles) with the kettle temperature being maintained at −10° to 0°. The temperature of the resulting mixture was gradually raised to 157° C. as gasous phosgene was sparged into the slurry over a period of three hours. The resulting clear solution was treated with phosgene for an additional two hours to insure complete reaction and subsequently with dry nitrogen for one hour to remove any remaining phosgene and by-product hydrogen chloride. After the nitrobenzene was removed by flash distillation, 194 grams (86.7 percent of theory) of product was recovered from a flash distillation. The product had a boiling point of 108–109° C. at a pressure of 0.15 millimeter of mercury and a freezing point of 42.5° C.

Upon analysis the product had the following composition: Calculated for $C_8H_4N_2SO_4$: C, 42.80; H, 1.78; N, 12.48; S, 14.30. Found: C, 42.62; H, 1.96; N, 12.25; S, 14.25. Infrared spectrum was in agreement with that expected for the subject compound with maxima at $4.45\mu$ (—NCO), $6.25\mu$ and $6.55\mu$ (phenyl C=C), $7.40\mu$ and $8.60\mu$ ($SO_2$), and $11.95\mu$ (paradisubstitution).

EXAMPLE II p-Isocyanatobenzenesulfonamide

A slurry of sulfanilamide (172 grams, 1.0 mole) in nitrobenzene (1000 grams) was added to a nitrobenzene (548 grams) solution of phosgene (396 grams, 4 moles) with the kettle temperature being maintained at −10° to 0° C. The temperature of the resulting mixture was gradually raised to 90° C. as gaseous phosgene was sparged into the slurry over a period of four hours. The resulting admixture was purged free of phosgene with nitrogen, cooled and filtered. The solid product was washed with ethyl ether and dried to yield 141 grams (71.2 percent of theory) of p-isocyanatobenzenesulfonamide. The product after recrystallizing from toluene, had a melting point of 156–157° C. and infrared adsorption at $2.99\mu$ ($NH_2$); $4.45\mu$ (NCO); $7.50\mu$ and $8.70\mu$ ($SO_2$). Upon analysis the product had the following composition: Calculated for $C_7H_6N_2O_3S$: C, 42.2; N, 14.13. Found C, 42.22; N, 14.19.

p - Isocyanatobenzenesulfonamide in methylisobutyl keetone reacted with aniline to give the aniline derivative having a melting point of 229–230° C. Infrared adsorption at 5.95 (substituted urea C=O), $7.6\mu$ and $8.7\mu$ ($SO_2$), and $13.35\mu$ and $14.4\mu$ (mono-substituted aromatic) are consistent with the assigned structure. Upon analysis the anilide derivative had the following composition: Calculated for $C_{13}H_{13}N_3O_3S$: N, 14.43. Found: N, 14.41.

EXAMPLE III p-Isocyanatobenzenesulfonamide p-Isocyanatobenzenesulfonyl isocyanate (22.4 grams, 0.1 mole) were dissolved in 250 milliliters of benzene and to this was added 1.8 grams (0.1 mole) of water. The reaction temperature rose from 28° to 38° C. during the addition. When the reaction had subsided, the mixture was filtered to yield 15 grams (75.8 percent) of p-isocyanatobenzenesulfonamide which on recrystallization from toluene had a melting point of 155–157° C. A mixed melting point of this material with that prepared by the method set forth in Example II was 156–157° C.

EXAMPLE IV 4,4′-ureylene bis(benzenesulfonamide)

A mixture of 5.0 grams (0.025 mole) of p-isocyanatobenzenesulfonamide, prepared as indicated in Example III, and an equimolar amount of water was stirred for 19 hours in an excess of water. Subsequent filtration and drying under reduced pressure yielded 3.0 grams (64.8 percent) of 4,4-ureylene bis(benzenesulfonamide) having a melting point of 253–256° C. Infrared adsorption at $3.02\mu$ and $3.1\mu$ (NH, $NH_2$). $5.91\mu$ (subst. urea C=O), and $7.55\mu$ and $8.7\mu$ ($SO_2$) are consistent with the assigned structure.

The reaction of 22.4 grams (0.1 mole) of p-isocyantobenzenesulfonyl isocyanate with water in an excess of water, afforded 18 grams (97.4 percent) of a material identical in infrared adsorption to 4,4-ureylene bis(benzenesulfonamide), and which, on recrystallization from water had a melting point of 260–262° C. Upon analysis the product was found to have the following composition. Calculated for $C_{13}H_{14}N_4O_5S_2$: C, 42.2; H, 3.78; N, 15.13; S, 8.66. Found: C, 42.00; H, 3.70; N, 14.98; S, 8.84.

EXAMPLE V

Methyl p-isocyanatophenylsulfonylcarbamate

Methanol, 3.2 grams (0.1 mole) in 25 milliliters of benzene was fed slowly to a solution of 22.4 grams (.1 mole) of p-isocyanatobenzenesulfonyl isocyanate in 250 milliliters of benzene. The mixture was stirred at 30° C. for 90 minutes, filtered, and the filtrate evaporated to yield 25.6 grams (100 percent) of a white solid having a melting point upon recrystallizing from toluene of 119° C. The product had infrared adsorption at $3.04\mu$ (NH); $4.38\mu$ (NCO); $5.78\mu$ (as in sulfonyl carbamates); $7.40\mu$ and $8.60\mu$ ($SO_2$), $8.20\mu$ (C—O); and $11.55\mu$ (found in sulfonyl carbamates). Upon analysis the product was found to have the following composition. Calculated for $C_9H_8N_2O_5S$: C, 42.2; H, 3.12; N, 10.92. Found: C, 42.37; H, 3.47; N, 11.39.

EXAMPLE VI

Dimethyl 4,4′-ureylene bis(phenylsulfonylcarbamate)

Methyl p - isocyanatophenylsulfonylcarbamate, 2.0 grams, was reacted with water, in an excess of water, for 19 hours. Filtration and drying gave 1.5 grams (79.2 percent) of material, having a melting point of 219° C. The material had infrared adsorption at $5.78\mu$ (carbamate C=O) and $5.92\mu$ (substituted urea C=O). Upon analysis the product had the following composition. Calculated for $C_{17}H_{18}N_4O_9S_2$: C, 42.0; H, 3.7; N, 11.52. Found: C, 42.35; H, 3.82; N, 11.44.

EXAMPLE VII

N-(allyloxycarbonyl)-4-allyloxyformamidobenzenesulfonamide

To a mixture of 69.6 grams (1.2 moles) of allyl alcohol and 100 milliliters of benzene was added 112 grams (0.5 mole) of p-isocyanatobenbenesulfonyl isocyanate in 300 milliliters of benzene during a period of one hour at 30–40° C. The mixture was heated at 60° C. for 3 hours, then filtered, washed with benzene and dried. The product obtained in 96 percent yield, melted at 158–159° C. Upon analysis the product was found to have the following composition. Calculated for $C_{14}H_{16}N_2O_6S$: C, 49.41; H, 4.75; N, 8.23. Found: C, 49.65; H, 4.92; N, 8.73.

EXAMPLE VIII

N-(allylcarbamoyl)-4-allylureylenebenzenesulfonamide

In a manner similar to that employed in Example VII, 97 grams (1.7 moles) of allylamine in benzene was treated with 168 grams (0.75 mole) of p-isocyanatobenzenesulfonyl isocyanate in benzene. The product obtained in 60 percent yield was recrystallized from ethanol and had a melting point of 203–204° C. Upon analysis the product had the following composition. Calculated for $C_{14}H_{18}N_4O_4S$: C, 49.75; H, 5.36; N, 16.56. Found: C, 49.79; H, 5.67; N, 16.15.

EXAMPLE IX

N-(n-butylcarbamoyl)-4-(n-butyl)ureylene benzenesulfonamide

In a manner similar to that employed in Example VII, 73.1 grams (1.0 mole) of n-butylamine in benzene was treated with 101 grams (0.45 mole) of p-isocyanatobenzenesulfonyl isocyanate. The product, obtained in 85 percent yield had a melting point of 192–193.5° C. Upon analysis the product was found to have the following composition. Calculated for $C_{16}H_{26}N_4O_4S$: C, 51.90; H, 7.70; N, 15.10. Found: C, 52.0; H, 7.50; N, 14.80.

EXAMPLE X

Polymer from 4-isocyanatobenzenesulfonyl isocyanate 4-isocyanatobenzenesulfonyl isocyanate (3.36 grams; 0.03 equivalent) and polypropylene glycol having a molecular weight of about 2025 (30.36 grams; 0.03 equivalent) were mixed well and transferred to an aluminum dish. The dish was covered loosely and placed in a 75° C. circulating-air oven. After 4 hours the temperature was elevated to 100° C. and maintained at that temperature for 16 hours. A polymeric material was obtained as a viscous liquid. Infrared analysis showed characteristic absorption maxima at $5.85\mu$ (carbamate C=O) and $7.35\mu$ and $8.60\mu$ ($SO_2$).

EXAMPLES XI–XV

Polymers from 4-isocyanatobenzenesulfonyl isocyanate

In a manner similar to that employed in Example X, various polymers were prepared from 4-isocyanatobenzenesulfonyl isocyanate and active hydrogen-containing compounds. The pertinent data is set forth in table below:

TABLE.—POLYMERS FROM 4-ISOCYANATOBENZENESULFONYL ISOCYANATE

| Example | Active hydrogen compound [1] | Grams | Equivalents | Isocyanate Grams | Isocyanate Equivalents | Reaction time [2] 75° C. | Reaction time [2] 100° C. | Description of product |
|---|---|---|---|---|---|---|---|---|
| XI | A | 8.82 | 0.06 | 6.72 | 0.06 | 4 | 16 | Hard, brown. |
| XII | B | 6.0 | 0.03 | 3.36 | 0.03 | 4 | 16 | Viscous liquid. |
| XIII | C | 6.6 | 0.06 | 6.72 | 0.06 | 4 | 16 | Hard. |
| XIV | D | 6.93 | 0.03 | 3.36 | 0.03 | 4 | 16 | Tacky. |
| XV | E | 15.18 | 0.015 | 3.36 | 0.03 | 4 | 16 | Tacky, elastomeric. |

[1] A=Propylene oxide adduct to a mixture of glycerin and triphenylolpropane hydroxyl No. of 380. B=Polyethylene glycol of molecular weight 400. C=Propylene oxide adduct to sorbitol hydroxyl No. of 509. D=Propylene oxide adduct to hexanetriol hydroxyl No. of 240. E=Polypropylene glycol of molecular weight 2025.
[2] Reaction time in hours.

EXAMPLE XVI

Ethylene bis(4-isocyanatophenylsulfonylcarbamate)

4-isocyanatobenzenesulfonyl isocyanate (22.4 grams, 0.1 mole) wis dissolved in 250 milliliters of benzene and maintained at 28° C. while ethylene glycol (3.1 grams, 0.05 mole) in 25 milliliters of benzene was added dropwise. Immediately on addition of the ethylene glycol a white solid precipitated. Thereafter the reaction slurry was stirred at 28° C. for 2 hours and filtered. There was obtained 10 grams of a white solid which represented 42 percent of the theoretical value. The product had a melting point of 165° C. and an infrared absorption consistent with the assigned structure and having a maxima at $4.4\mu$ (—NCO), $5.75\mu$ (carbamate C=O), and $7.35\mu$ and $8.7\mu$ ($SO_2$).

What is claimed is:
1. m-Isocyanatophenylsulfonyl isocyanate.
2. p-Isocyanatophenylsulfonyl isocyanate.

References Cited

UNITED STATES PATENTS

| | | | |
|---|---|---|---|
| 2,866,774 | 12/1958 | Price | 260—77.5 |
| 2,929,800 | 3/1960 | Hill | 260—77.5 |
| 2,542,597 | 2/1951 | Tulagin | 260—470 |
| 2,542,596 | 2/1951 | Tulagin | 260—470 |
| 3,002,982 | 10/1961 | Fand | 260—397.7 |
| 3,121,102 | 2/1964 | Tull | 260—397.7 |
| 2,394,597 | 2/1946 | Dickey | 260—453 |
| 2,611,782 | 9/1952 | Bortnick | 260—453 |
| 2,225,661 | 12/1940 | Schirn | 260—397.7 XR |

FOREIGN PATENTS 692,360   6/1953   Great Britain.

OTHER REFERENCES

McKee et al.: J. Am. Chem. Soc., vol. 68, pp. 2506–2507 (1946).

Northey: The Sulfonamides and Allied Compounds, pp. 168–169, Reinhold Publishing Corp., New York (1948).

CHARLES B. PARKER, *Primary Examiner.*

D. H. TORRENCE, *Assistant Examiner.*

U.S. Cl. X.R.

260—2.5, 75, 77.5, 239, 248, 353, 456, 463, 464, 465, 465.4, 470, 481, 553, 556